US006317682B1

(12) United States Patent
Ogura et al.

(10) Patent No.: US 6,317,682 B1
(45) Date of Patent: Nov. 13, 2001

(54) ROAD INFORMATION COMMUNICATING SYSTEM

(75) Inventors: Toshihiko Ogura; Keiichi Nishimoto, both of Yokohama (JP)

(73) Assignee: Public Works Research Institute (JP)

( * ) Notice: Subject to any disclaimer, the term of this patent is extended or adjusted under 35 U.S.C. 154(b) by 0 days.

(21) Appl. No.: 09/376,228

(22) Filed: Aug. 18, 1999

(30) Foreign Application Priority Data

Aug. 27, 1998 (JP) ........................................ 10-241396

(51) Int. Cl.[7] ........................................ G01C 21/20

(52) U.S. Cl. .......................... 701/117; 701/207; 340/993; 455/456

(58) Field of Search .................................... 701/117, 118, 701/119, 201, 205, 211, 207, 208; 340/905, 903, 902, 991, 992, 993, 996; 455/456, 457

(56) References Cited

U.S. PATENT DOCUMENTS

| | | | | |
|---|---|---|---|---|
| 5,133,081 | * | 7/1992 | Mayo | 455/18 |
| 5,214,793 | * | 5/1993 | Conway et al. | 455/49.1 |
| 5,289,183 | * | 2/1994 | Hassett et al. | 340/905 |
| 5,504,683 | * | 4/1996 | Gurmu et al. | 701/117 |
| 5,610,821 | | 3/1997 | Gazis et al. . | |
| 5,699,056 | * | 12/1997 | Yoshida | 340/905 |
| 5,729,214 | * | 3/1998 | Moore | 340/905 |
| 5,864,305 | * | 1/1999 | Rosenquist | 340/905 |
| 5,889,477 | * | 3/1999 | Fastenrath | 340/905 |
| 5,900,825 | * | 5/1999 | Pressel et al. | 340/905 |
| 6,012,012 | * | 1/2000 | Fleck et al. | 701/117 |

FOREIGN PATENT DOCUMENTS

| | | |
|---|---|---|
| 40 34 681 A1 | 10/1990 | (DE) . |
| 0 756 153 A2 | 1/1997 | (EP) . |

* cited by examiner

*Primary Examiner*—Tan Nguyen
(74) *Attorney, Agent, or Firm*—Fulbright & Jaworski LLP

(57) ABSTRACT

A road information communicating system is provided in which a central communication system communicates with vehicles using a network of distributed information processing units. Each of these distributed information processing units is able to receive local road information and compute a set of local coordinates corresponding to that local road information. It is then able to relay that information to the central unit and receive like information from other distributed units. The information is then prioritized, and a subset of that prioritized data is selected and transmitted to vehicles in the coverage area.

4 Claims, 9 Drawing Sheets

506

| I/F number | Address (Coordinate) |
| --- | --- |
| # 0 | $X_{01}$, $Y_{01}$, $Z_{01}$ |
| # 0 | $X_{02}$, $Y_{02}$, $Z_{02}$ |
| ⋮ | ⋮ |
| # n | $X_{nm}$, $Y_{nm}$, $Z_{nm}$ |

FIG. 15

507

| LF | IF | I |
|---|---|---|
| ⋮ | ⋮ | ⋮ |
| 0 | I | I 0 |
| 1 | I | I 1 |
| 2 | I | I 2 |
| ⋮ | ⋮ | ⋮ |

ROAD INFORMATION COMMUNICATING SYSTEM

FIELD OF THE INVENTION

The present invention relates to a road traffic control/management system, and more specifically to a road information communicating system well adapted to provision of information concerning local events.

BACKGROUND OF THE INVENTION

To solve the problems in current road traffics, there have been various efforts for development of the so-called Intelligent Road Traffic System (described as ITS hereinafter). Feasibility of the ITS have been examined in various countries, and in Japan there is the Vehicle Information and Communication System (described as VICS hereinafter), which has been put into practical use. Also test use of the Electronic Toll Collection (described as ETC hereinafter) will be started in the near future. The VICS is positioned as a more advanced version of a navigation system, and with the VICS it is possible to provide detailed information such as information on traffic jam, information concerning a time required to reach a destination, or information on traffic troubles. Also with the ETC, it is possible for a driver to pay a fee for an express-highway without stopping by executing radio communications between the driver's vehicle and the ETC or a toll-booth and electronically paying the fee. Details of these systems are disclosed in a web site on Internet (for instance, URL: http//www.moc.go.jp/road/road/h9point/2-2.htm).

As a further advanced version of ITS, now the possibility of realization of a more sophisticated Advanced-cruise-assist Highway System (described as AHS hereinafter) is now under examination, and in order to realize the advanced service as described above, it is necessary to provide various types of information concerning traffics and road management to discrete vehicles in a wide area. In the case of VICS, information is provided by wide area communications, but still communications with each discrete vehicle required for automatic driving has not been realized. The ETC is installed at a tool-booth and can provide communications with discrete vehicles, but only in a limited area.

Specific requirements for realization of the AHS will be studied in the future, for the most urgent and important objective to be achieved in the traffic control/management system is to prevent generation of a traffic accident which might be evaded with appropriate countermeasures, and more specifically it is now required to construct a system which can provide detailed information required to prevention of traffic accidents to each discrete vehicle. For instance it is clear that a chain-reaction traffic accident can be prevented or a gravity of the accident can be mitigated, when a traffic accident is caused by a car, if drivers of following cars know the accident. When a traffic accident or the like occurs, a traffic jam occurs, and in that case, if it is possible to provide information useful not only for grasping general information of the site of traffic accident, but also for making determination as to whether each driver should select another route for going around the site or should put up with the jam with a broadcasting type of communication system, it would be very effective for preventing generation of a traffic jam or for preventing a traffic jam from escalating into a large-scale one. Namely, it has been desired to develop a system capable of providing controls over the entire road network, when the system detects a state of a road or the like, by processing the information into that suited to each discrete vehicle and supplying the customized information to each discrete vehicles.

It is necessary to deliver information, which is to be supplied to a driver of a vehicle running on a road, as that based on positional data. For instance, it is necessary to deliver information such as "A traffic accident has occurred at point A, and a traffic jam is extending up to point B", or "A landslip has occurred at point C, and drivers are asked to go around through point D", or "Mist has been generated at around point E, and visibility is poor" to each driver on the road. In the examples above, the former two examples are cases concerning local events, while the last one is information on whether conditions and the information relates to a substantially wide area. As described above, all of information based on positional data can not always be treated in the same manner, and to provide detailed information satisfying each driver's need, it is important to clarify a positional relation between an event causing a trouble on a road and a vehicle's driver who receives the information. Namely, it is important to deliver appropriate information corresponding to a vehicle's position and also corresponding to a gravity of the trouble. Realization of a traffic control/management system and road information communicating system satisfying the requirements as described above is one of the objects of the present invention.

In a case of a chain-reaction traffic accident, drivers of vehicles running near and toward the site can prevent generation of a secondary traffic accident by knowing generation of the accident as early as possible, so that the information is urgent and important, but the importance becomes lower to vehicles running at positions slightly afar from the site. To vehicles running at positions further distant from the site of traffic accident, general information such as that concerning a type of traffic accident is enough.

It is an object of the present invention to realize a road information communicating system which can provide information concerning a situation on a road network to drivers by changing contents of the information according to each driver's position.

Further if information on various types of event is transmitted, even though a volume of each information is small, communication traffics in the entire road information communicating system is quite large, so that it is necessary to realize a transfer system or a transfer method capable of preventing increase of data traffic, and it is another object of the present invention to provide a road information transfer system or road information communicating system satisfying the needs as described above.

OBJECT AND SUMMARY OF THE INVENTION

It is an object of the present invention for solving the problems as described above to provide a road information communicating system in which a means for adding positional coordinate data to information to be delivered is provided in each device in an information transfer system, a distance between a vehicle and a site of traffic accident or the like is computed from positional coordinate data included in received information and those for the vehicle, the device determines a level of required information from the computed distance and changes contents of information to be delivered to each vehicle according to the level, or aborts the information for enabling appropriate and efficient information delivery.

BRIEF DESCRIPTION OF THE DRAWING

FIG. 15 is a view showing a format of a level information table according to the present invention.

DETAILED DESCRIPTION OF THE PREFERRED EMBODIMENTS

Figure 1:
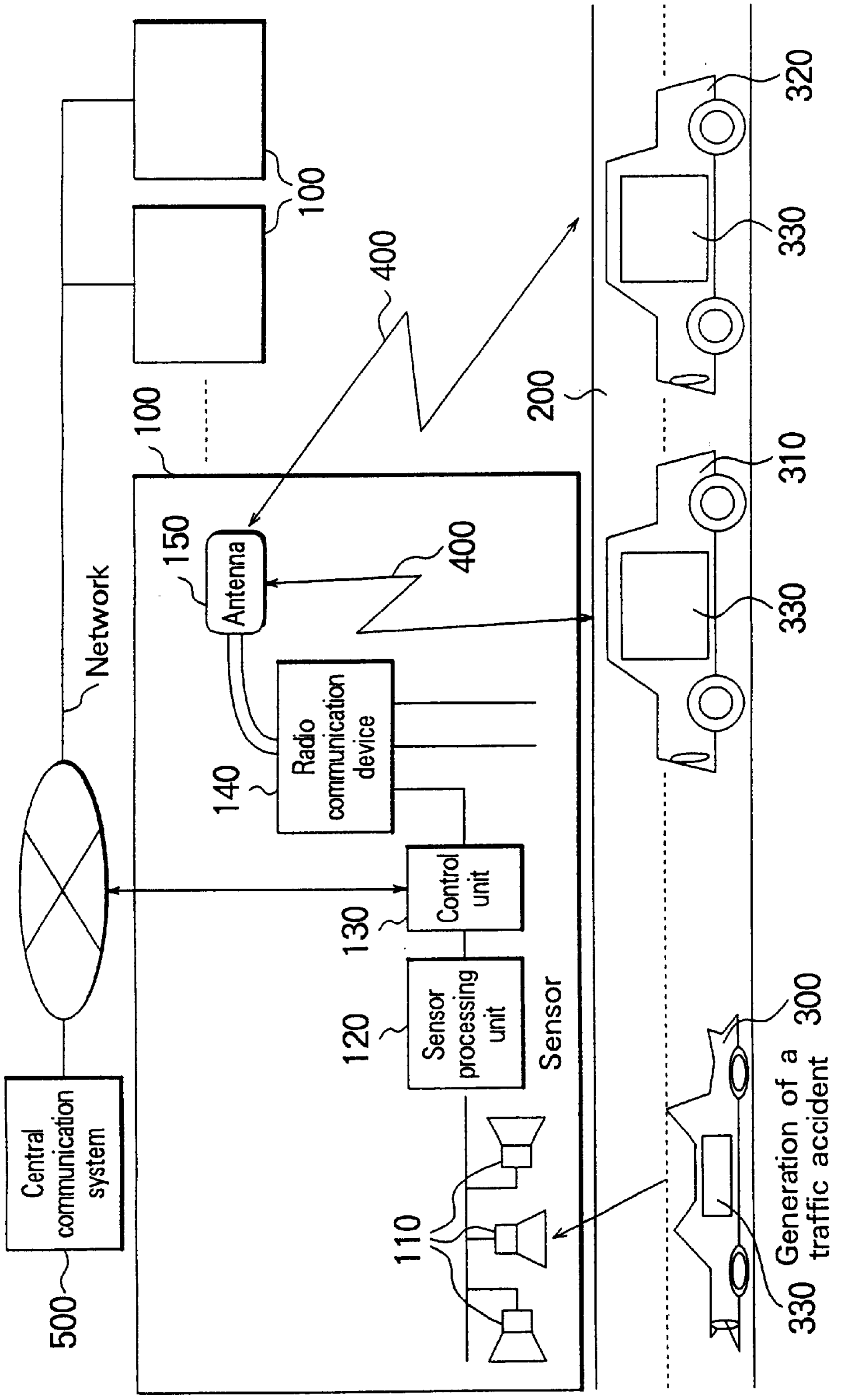
FIG. 1 is a block diagram showing an entire system according to Embodiment 1 of the present invention.
Figure 2:
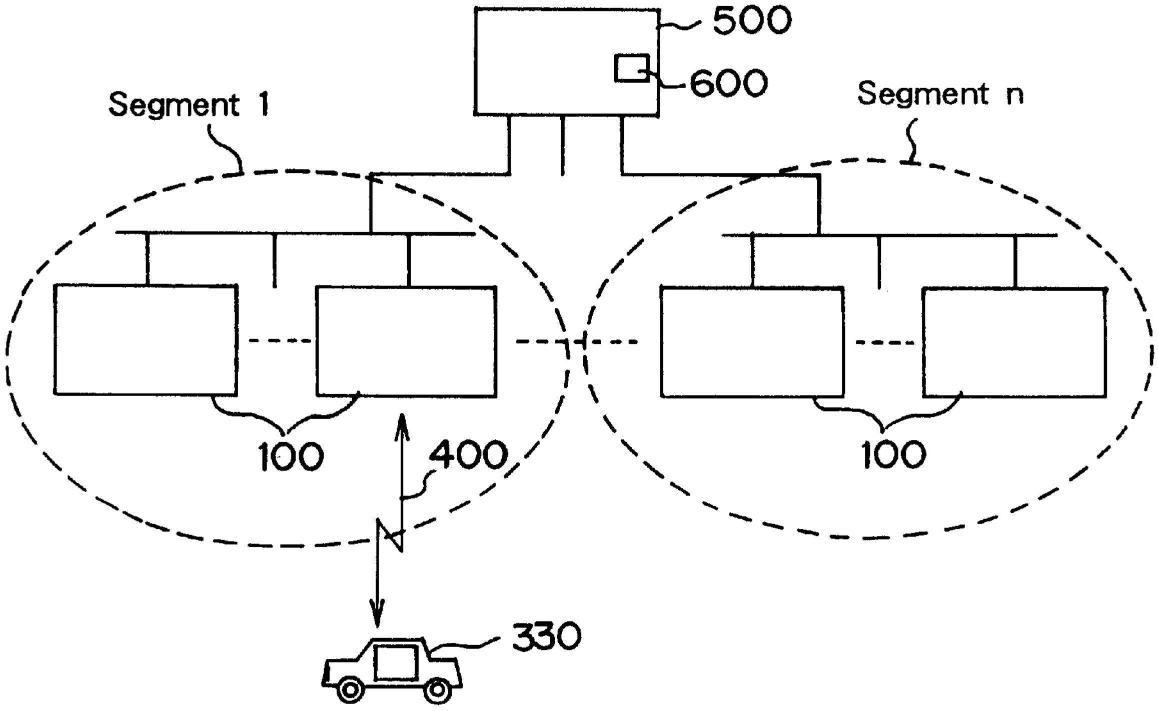
FIG. 2 is a view showing connection in the system shown in FIG. 1.

Detailed description is made hereinafter for preferred embodiments of the present invention with reference to the related drawings. FIG. 1 is a system block diagram showing an entire configuration of this embodiment, and FIG. 2 is a view showing connection in the system. In this embodiment, a plurality of information communicating devices 100 are provided along a road, the information communicating devices 100 are connected through a network to each other, and information required for management of the road is transacted through, of a vehicle 300 having caused a traffic accident and vehicles 310, 320 not having caused a traffic accident each having a vehicle-loaded communicating device 330 described later, communicating devices of the vehicles 310, 320 and a radio line 400, and description of the vehicle 300 having caused an accident is made in relation to operations in this embodiment described later. When the system scale becomes larger, namely when a distance between the information communicating devices 100 becomes larger, a central communication system 500 described later is provided to connects the information communicating devices 100 to each other via the network and this central communication system 500.

More specifically, in this embodiment, information communicating devices 100 are located along or around a road 200 at an appropriate interval linearly, on a plane, or three-dimensionally, and when an event to be reported to vehicles occurs on or around the road 200, information is concerning a situation of the road or required for management of the road is generated according to a distance between a site of the event and a position of a vehicle to which the information is to be delivered, and the information is transacted through the vehicles 310, 320 and the radio line 400 as described above. A range in which the information communicating devices 100 are connected to each other only through a network or a transfer path, and not via the central communication system 500 is described as a segment hereinafter.

The information communicating device 100 in this embodiment comprises, as shown in FIG. 1, a plurality of sensors 110 each for monitoring and grasping a state of a road, a sensor processing unit 120 for collecting information from these sensors 110 and converting the information to signals, a control unit 130 described later in detail and having an interface with a network or a moving body such as a vehicle as a target for delivery of information and executing data processing or communication control from the entire information communicating devices 100, and a radio communication device 140 and antenna 150 for radio communications of road information with the moving body. Then information indicating generation of any unusual situation on or around the road detected by the sensor 110 is processed in the sensor processing unit 120, and then the data is transferred by the control unit 130 to the central communication system 500 and the abnormal state is reported to the vehicles 310, 320 running near the site of event via the radio communication device 140 and antenna 140 and through the radio line 400.

Figure 3:
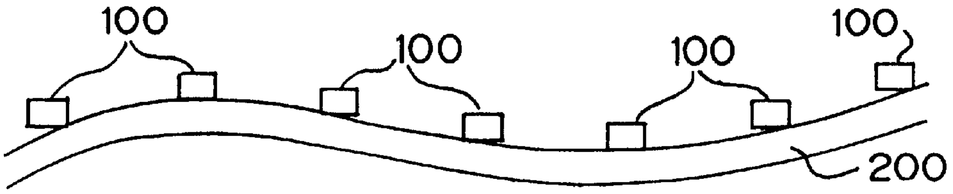
FIG. 3 is a view showing an example of arrangement of information communicating devices in the system.
Figure 4:
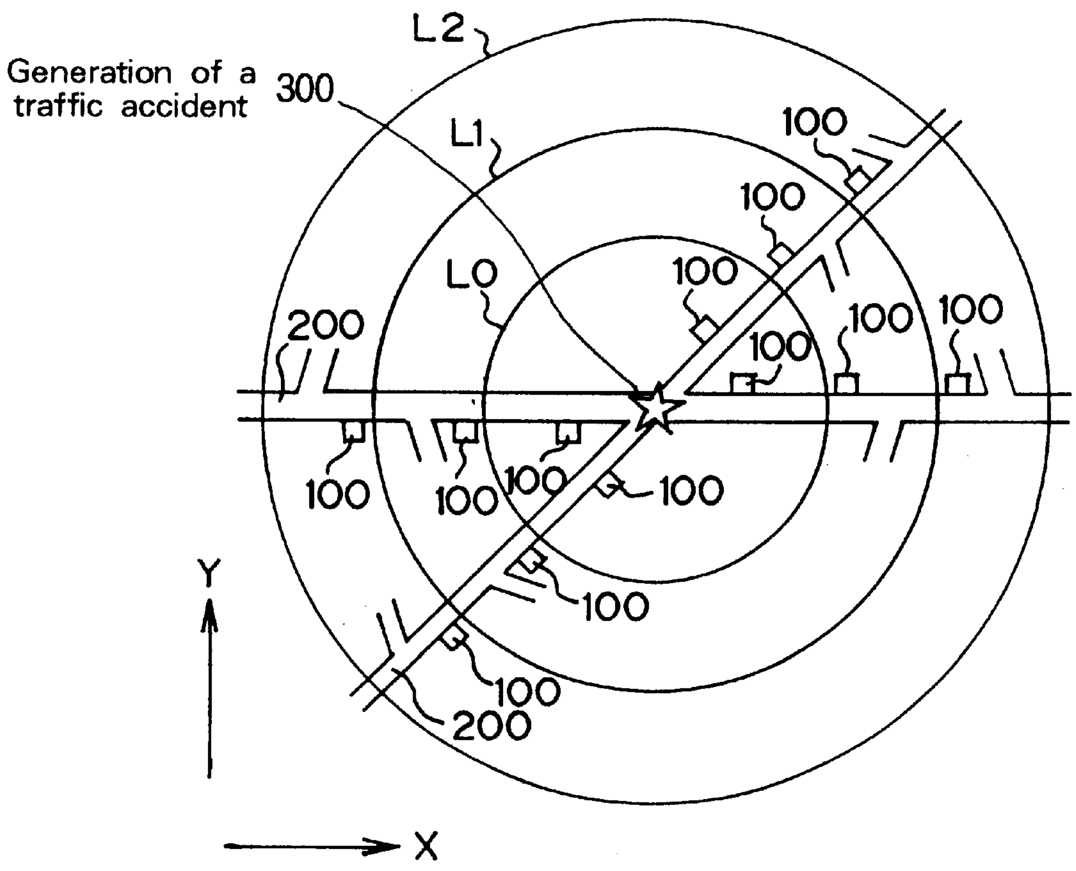
FIG. 4 is a view showing another example of arrangement of information communicating devices in the system.

FIG. 3 is a view showing an example in which the road information communicating system according to the present invention is installed on the road 200, which is, for instance, an express-highway, and the information communicating devices 100 are provided at a substantially uniform interval. FIG. 4 shows another example in which the information communicating devices 100 are provided on a plurality of roads 200, and in this example the information communicating devices 100 are regularly located at a substantially uniform interval therebetween. Although not shown in the figure, this type of road network generally includes junctions of three or five roads or the like, so that arrangement of the information communicating devices 100 is quite complicated. In the examples, connection of the information communicating devices 100 as shown in FIG. 2 or communication with the central communication system 500 is not shown for simplifying the view.

In the road information communication system according to the present invention, one of the important points is to identify a position for transaction of road information such as a position where an event on or around a rod is generated and a position of the information communicating device 10 or a vehicle, or a distance. In the example shown in FIG. 3, arrangement of the information communicating devices 100 may topologically be considered as linear, so that it is possible to identify a position or a distance by assigning a number of each information communicating device 100 located on a road according to the order of location. On the other hand, in the example shown in FIG. 4 or in a case where the information communicating devices 100 are located on an ordinary road, the information communicating devices 100 are arranged on a plane two-dimensionally. There may be a three-dimensional or solid arrangement at as that at a multi-level crossing, but the care is generally rare, so that description is made hereinafter for a method of identifying a position or a distance in the road information communicating system according to the present invention assuming a case where the information communicating devices 100 are two-dimensionally located.

Specifically, identification of a position or a distance by the information communicating device 100 is performed by using X and Y coordinate values as shown in FIG. 4 or two-dimensional coordinate values such as longitude and latitude. Generally a two-dimensional distance is obtained from differences $\Delta X$ and $\Delta Y$ in X and Y coordinate values between the information communicating device 100 and another information communicating device 100 or a target for control such as a vehicle through the following equation (1):

$$\text{Distance } R=\text{SQRT } (\Delta X^{}2+\Delta Y^{}2) \quad (1)$$

(Herein SQRT ( ) indicates a root, while ** indicates an exponent.)

In a case of an ordinary road information communicating system, however, precision of information concerning a distance as computed through the equation (1) is not required, so that a method of identifying a position or a distance requiring only simple operations for computing is employed in the present invention.

In FIG. 4, the information communicating device 100 corresponding to a source of transmission of information is indicated by a filled rectangular form, and when computing a distance from this information communicating device 100, either one of X and Y coordinate values for another information communicating device 100 or a target such as a vehicle having a larger absolute value, namely a value obtained through the following equation is employed as a distance:

$$\text{Distance } R=\text{Max } (|\Delta X|, |\Delta Y|) \quad (2)$$

Herein $\Delta X$, $\Delta Y$ indicate a difference in coordinate values, and $|\Delta X|$ is an absolute value, while Max( ) indicates that the maximum value in the parentheses is used for computing. There are various methods of defining a distance other than that described above, and other methods of computing a distance may be employed.

Figure 5:
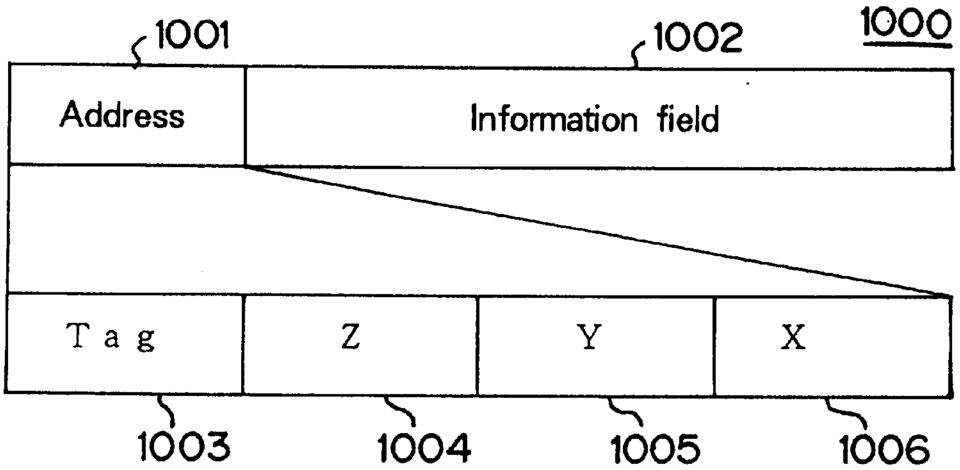
FIG. 5 is a signal configuration diagram showing an example of configuration of information transacted through the system.

FIG. 5 is a signal configuration view showing configuration of information transacted between information communicating devices 100 in the road information communicating system according to the present invention or between the information communicating device 100 and a vehicle, and also showing configuration of an address section. Also FIG. 6 is a view showing signal configuration of a signal field.

In the road information communicating system according to the present invention, road information is transacted between the information communicating devices 100 or between the information communicating device 100 and a vehicle using a signal 1000 comprising an address 1001 and an information field 1002 shown in FIG. 5. More specifically, the address 1000 comprises three-dimensional coordinate values X, Y, and Z indicating positions of the information communicating device 100, a site of generation of an event, or a vehicle put in bit positions of 1006, 1005, 1004 respectively. When there is a surplus of bit number at the address 1001, the surplus bit 1003 is used from a tag indicating something. The present invention mainly aims for two-dimensional arrangement of information communicating devices, so that the Z coordinate value may be omitted. Also only one example of order is shown, the configuration is not limited to this order. In the information field 1002, data on a plurality of information levels (1010, 1012, 1014) as described more detailedly later and a plurality of information on a road and a distance (1011, 1013, 1015) are put in for signal transaction.

Figure 6:
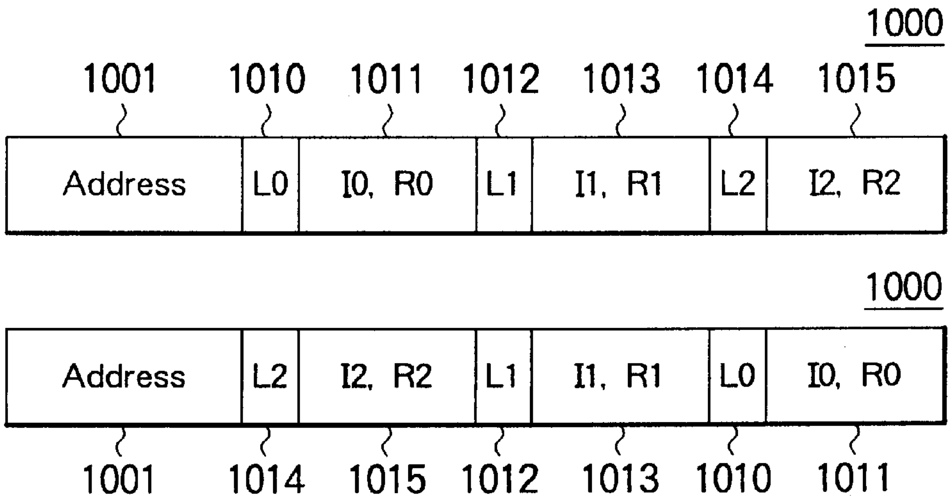
FIG. 6 is a signal configuration diagram showing an example of configuration of an information field in the system.

Description is made for road information treated in the road information communicating system according to the present invention, and more specifically for levels or contents of information transmitted from or received in the information field shown in FIG. 6, a concept of distance, and a way of treating the data. At first description is made for contents of information delivered when a traffic accident occurs with reference to the system shown in FIG. 1. FIG. 1 shows only an area around a site of a traffic accident, but it can be considered that it is necessary to provide information having the contents as described below to vehicles within a range where provision of the information is required:

(1) "A traffic accident has occurred, so that you should stop running at once. Otherwise you may cause another traffic accident" to vehicles near the site of the traffic accident (2) "A traffic accident has occurred near. If you continue to drive without changing a course, you will come across with the site" for vehicles slightly afar from the vehicle 300

(3) "A traffic accident has occurred at a forward position, and a traffic jam has been generated" to vehicles slightly far from the site of traffic accident, and (4) "A traffic accident has occurred at position A (at the site of traffic accident)".

In the road information communicating system according to the present invention, the information (1), (2) and (3) are treated as information (I0) at level 0 (L0), information (I1) at level 1 (L1), and information (I2) at level 2 (L2). The final type of information (4) is that generally treated in the current road traffic information system or the like.

Next description is made for information treated in the road information communicating system according to the present invention assuming that the information is classified to those at three levels from level 0 to level 2. It is clear that the information I0 is for vehicles near the site of traffic accident, and as the information is required to immediately stop vehicles for road control such as prevention of generation of a secondary calamity, and if this type of information is provided to vehicles at positions far from the site of accident, the traffic conditions would be all the more disturbed. So the information I0 is delivered to vehicles within a distance R0 closer to the site of generation of the event. Information I1 is for vehicles further from the site of generation of the event as compared to vehicles requiring information I0 at level 0, and is not urgently required for road control such as prevention of generation of a traffic jam, but is necessary for stopping vehicles or alerting vehicles to change courses, or for warning. If this type of information I1 is supplied to vehicles very far from the site of generation of the event, drivers of the vehicles suspect reliability of the road information, so that this type of information should preferably be delivered to vehicles outside the range R0 but within a range R1 larger than the range R0.

The information I2 is similar to the general information shown in (4) above, but this type of information is required, when a traffic accident has been generated and also a traffic jam has occurred or it is expected that a traffic jam will occur, for drivers of the vehicles to always get aware of the alert and take necessary measures for going around the site of generation of the event or the like for the purpose to mitigate the traffic jam or to minimize a delay in arrival time to the destination, and different from information at level 0 or at level 1, this type of information does not require any compulsory control of vehicles to the drivers. It is needless to say that, if the information at this level is distributed at random to many vehicles, reliability of road information is lost like in a case of the information I1, which causes troubles in road control, so that the information should be delivered to vehicles within a specified range. For this reason, the information I2 is delivered to vehicles outside the range R1 but within the range R2.

As described above, information at each level should preferably deliver contents varying according to a distance from a site of traffic accident. Also a driver may miss information, if the information is provided only once, so that it is important to provide information several times. This means that information at each level is delivered to vehicles decided according to the information delivery distances R0, R1, R2 respectively. FIG. 4 shows examples of configuration of zones L0, L1, L2 at three levels respectively with bold frames, and this figure shows a case where an appropriate circular zone is employed when a distance is computed through the equation (1). Also in this figure, an information communicating device functioning as a transmission source of information is indicated by a filled rectangular form.

In the example shown in FIG. 1, information from a sensor 110 in an information communicating device 100 detected the vehicle 300 having caused a traffic accident is analyzed by a sensor processing unit 120, and a control unit 130 in the information communicating device 100 transfers road information consisting of an information level, information for each delivery level, a distance or the like with signal formats as shown in FIG. 5 and FIG. 6 to a radio communication device 140 and a network. As an address 1001 in this case, coordinates of the information communicating device 100 having detected an event generated on or around a road such as a traffic accident with a sensor are set as Xa, Ya. Transferred data is received by another information communicating device 100. It is assumed herein that coordinates of the information communicating device 100 having received the data are Xb, Yb. The received data is used by zone determination by the control unit 130 in the information communicating device 100 as described later.

Figure 7:
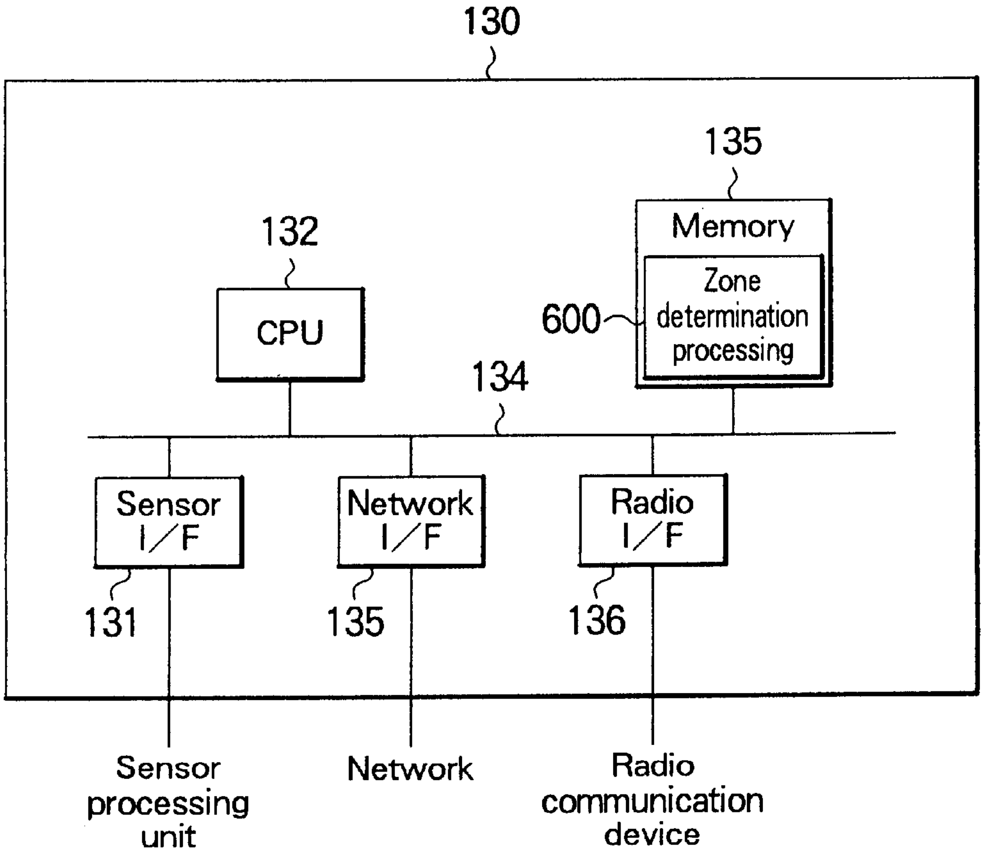
FIG. 7 is a block diagram showing an example of configuration of a control unit provided in the information communicating device in the system.

FIG. 7 is a block diagram showing the control unit 130, and this control unit 130 comprises a sensor processing unit 120, a sensor interface circuit 131 for sending or receiving road information, a network interface circuit 133 for connecting the information communicating devices 100 to each other, a radio interface circuit 136 with a radio communication device 140, a CPU 132 for controlling the entire control unit 130, and a memory 135 for storing therein road information or the like, and the devices are connected to each other through a bus 134. The control device 130 stores data comprising road information from each interface circuit such as the network interface circuit 133 or the like via the bus 134 in the memory 135, while the CPU 132 processes the data for controlling the information communicating devices 100 to execute zone determination processing.

Figure 8:
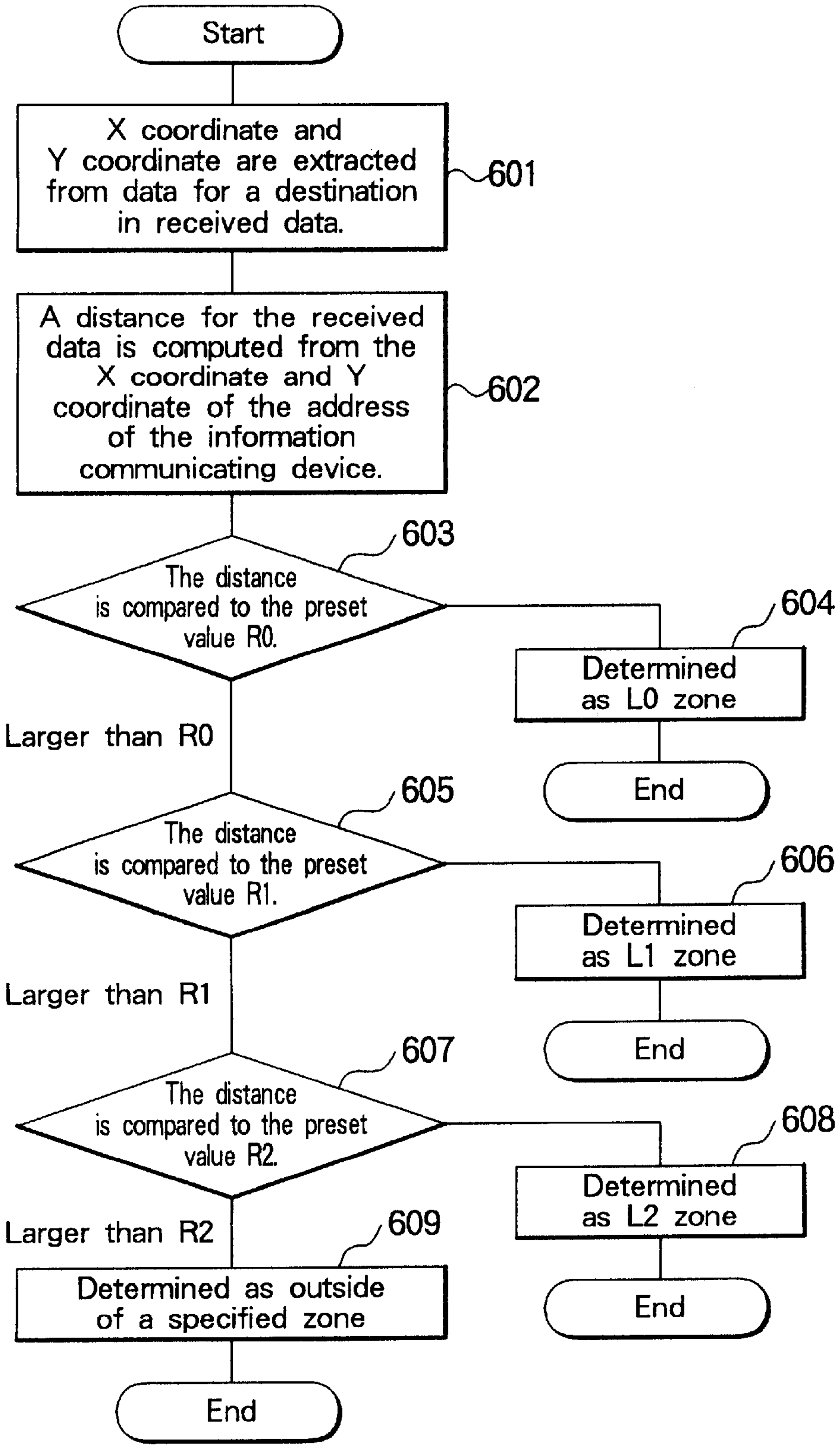
FIG. 8 is a view showing a processing flow for zone determination carried out by the control unit above.

Now description is made for the zone determination processing with reference to FIG. 8.

(1) Coordinates Xa, Ya of an information transmission source is obtained in processing 601.

(2) As coordinates Xb, Yb of the information communicating device have been known, a distance from the information source is obtained in processing 602. Namely the Max (|Xa−Xb|, |Ya−Yb|) is computed.

(3) When the distance R is computed, the distance R is compared to R0 in processing 603, and if R is equal to or smaller than R0, system control shifts to processing 604, and it is determined that the information communicating device is within the L0 zone viewed from the information transmission source.

(4) If R is larger than R0, R is compared to R1 in processing 605, and when it is determined that R is equal to or smaller than R1, system control shifts to processing 606, and it is determined like in (3) that the information communicating device is within the L1 zone.

(5) If R is larger than R1, R is compared to R2 in processing 607, and when it is determined that R is equal to or smaller than R2, it is determined that the information communicating device is within the L2 zone.

(6) When it is determined that R is larger than R2, it is determined that the information communicating device is outside the zone, and data comprising the received information is aborted.

When the control unit 130 determines in the determination processing 600 that the information communicating device is within any of L0 to L2 zones, the control unit 130 transfers data comprising road information to vehicles within the responsible area via the interface circuit 136 with the radio communication device and antenna 150. It should be noted that, although the case described below assumes that received information at each level is transferred as it is, as the information communicating device 100 determines information for each zone, optimal data may be selected from the received data to send the selected data.

Figure 9:
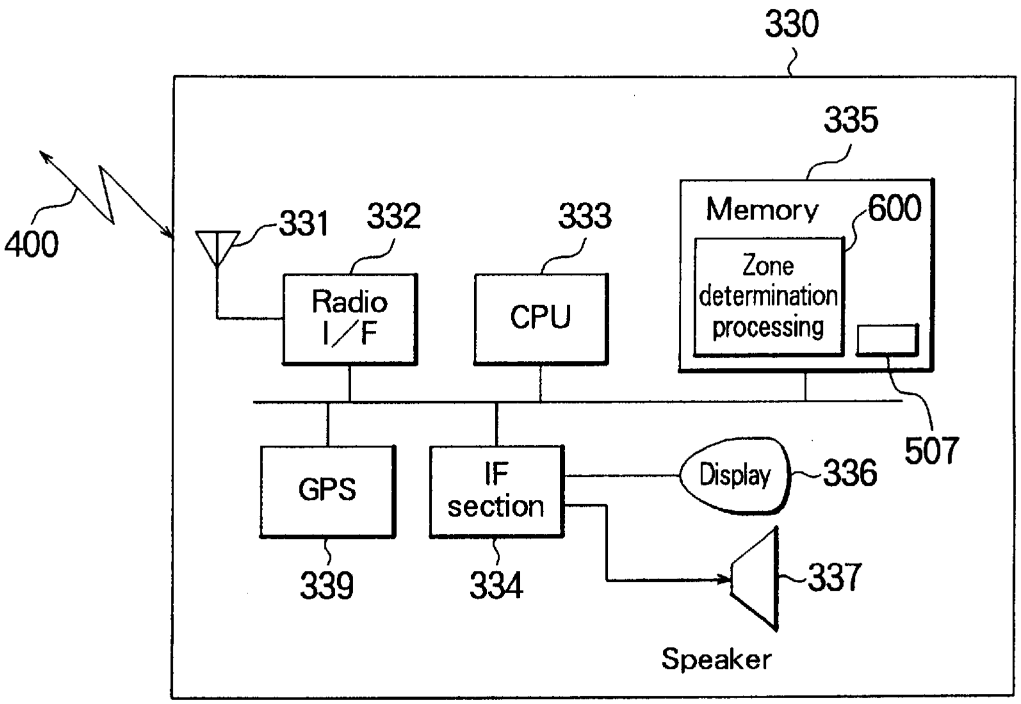
FIG. 9 is a block diagram showing an example of configuration of a vehicle-loaded communicating device used in the system.

FIG. 9 is a block diagram showing an example of configuration of the vehicle-loaded communication device 330. This vehicle-mounted communication device 330 comprises an antenna 331 sending or receiving road information via the radio line 400, a radio interface circuit 332, a CPU 333 for controlling the entire vehicle-mounted communication device 330, a memory 335 for storing therein programs or data required for control processing by the CPU 333 or road information, a displayed alarm interface circuit 334 for alerting received road information to drivers of vehicles, and a GPS circuit 339 for fetching positional information for vehicles, and the circuits are connected to each other through a bus 338. It should be noted that an information display unit 336 for reporting road information to vehicle's drivers and a speaker 337 for generating an alarm sound or the like are connected to the displayed alarm interface circuit 334. Any types of information display section 336 and speaker 337 may be used on the condition that it can provide road information to vehicle's drivers. Also any type of vehicle navigator may be used as the GPS circuit so long as it can detect coordinates indicating a position of a vehicle.

When a vehicle equipped with a vehicle-mounted communication device 330 is passing through a zone specified for one information communicating device 100, the vehicle-mounted communication device 330 stores road information received via the radio interface circuit 332 and bus 338 in the memory 335. The vehicle-mounted communication device 330 has a zone determination processing 660 like that executed by the control unit 130 in the information communicating device 100, and the CPU executes determination according to the determination flow shown in FIG. 8 and provides any of information I0, I1, I2 at an appropriate level using the information displays section 336 and speaker 337 via the displayed alarm interface circuit 334.

Figure 13:
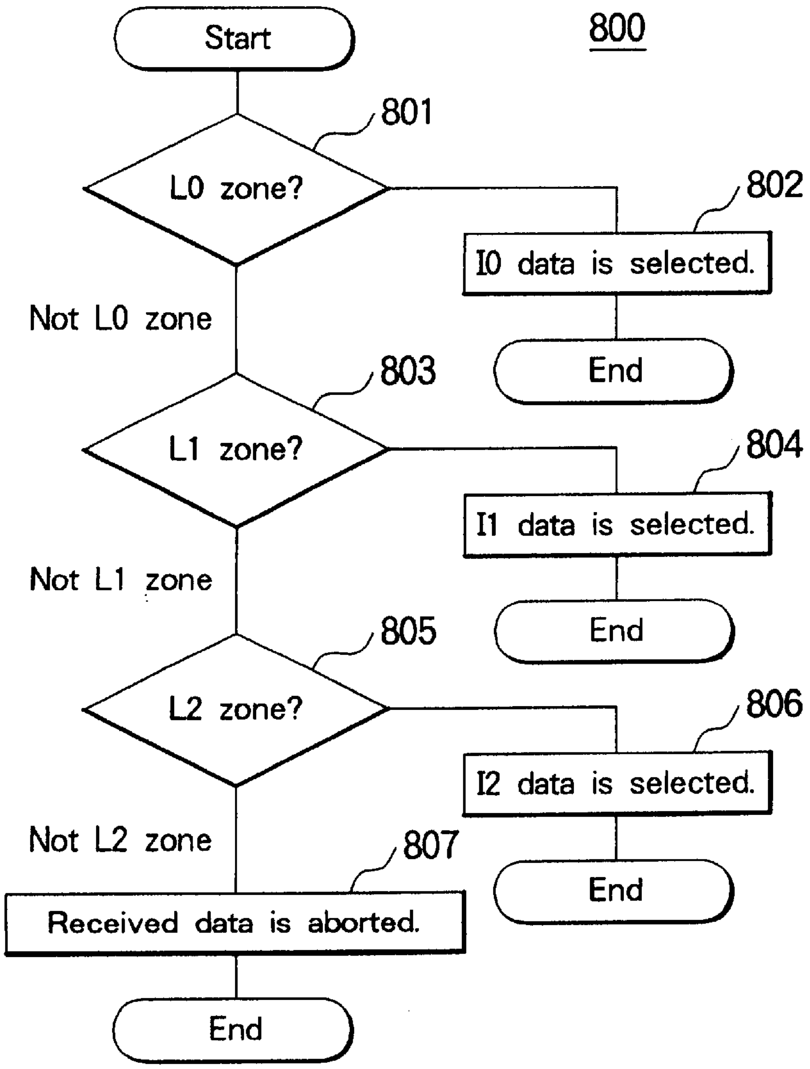
FIG. 13 is a flow chart showing a flow of operations in information level selection processing carried out according to the present invention.

FIG. 13 is a level selection processing flow chart showing operations by the information communicating device 330 for selecting information from the received information. The information communicating device 330 selects information from the zone information obtained as shown in the determination flow chart in FIG. 8 by executing the level section processing 800 as described below, and provides the information to drivers of vehicles or other related persons.

(1) When it is determined in the processing 801 that any vehicle is within the L0 zone, information I1 data is selected in processing 804.

(2) When it is determined in processing 803 that any vehicle is within the L1 zone, information I0 data is selected in processing 804.

(3) When it is determined in processing 805 that any vehicle is within the L2 zone, information I1 data is selected in processing 806.

(4) When it is determined that no vehicle is within L2 zone, received data is aborted in processing 607.

It should be noted that an address of a vehicle (values corresponding to Xb, Yb described above) are computed from positional information obtained by the GPS circuit 339.

Now description is made for operations in Embodiment 1 of the present invention. At first the vehicle 300 having caused a traffic accident shown in FIG. 1 is detected. The information communicating device 100 sends out data comprising road information with the format shown in FIG. 6. It is assumed herein that, of the vehicles running after the vehicle 300, the vehicle 310 is within the level 0 zone, and that the vehicle 320 is within the level 1 zone. When the information communicating device 100 sends information via the radio line 400 to the vehicles 310, 320, the vehicle-mounted communication device 330 on the vehicle 310 determines from the received data that the information is at level 0, and delivers the information I0 via the display section 336 or speaker 337 to the vehicles. Contents of the information I0 is that "A traffic accident has occurred, and you should stop immediately. Otherwise you get involved in a trouble". Likely the vehicle-mounted communication device 330 on the vehicle 320 determines from the received information that the information is at level 1, and delivers the information I1 via the display section 336 or speaker 337 to the corresponding vehicles. Contents of the information I1 is, for instance, "A traffic accident has occurred near. You will come across with the site of traffic accident, if you drive without changing the speed". As described above, it is possible to deliver information varying urgency and importance according to a position of each vehicle.

Figure 10:
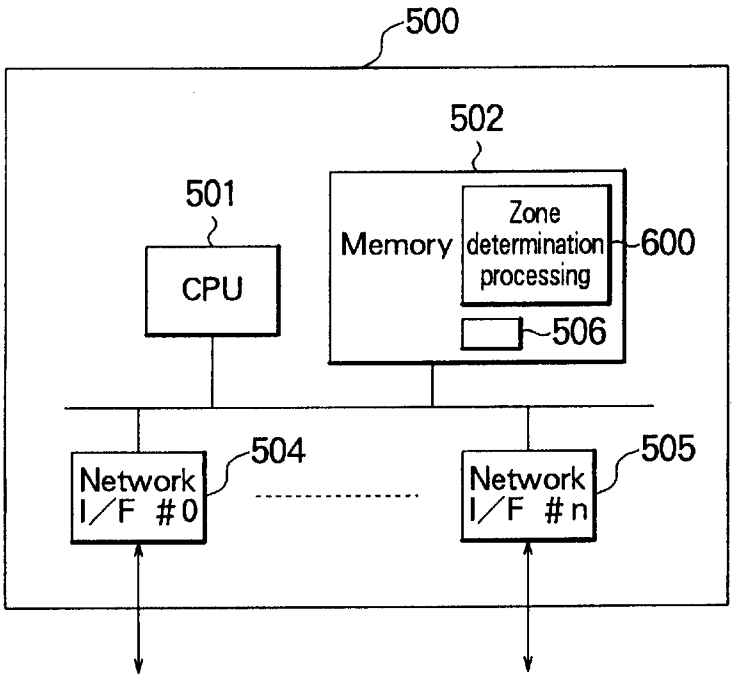
FIG. 10 is a block diagram showing an example of configuration of a central communication system in the system.
Figures 11, 12:
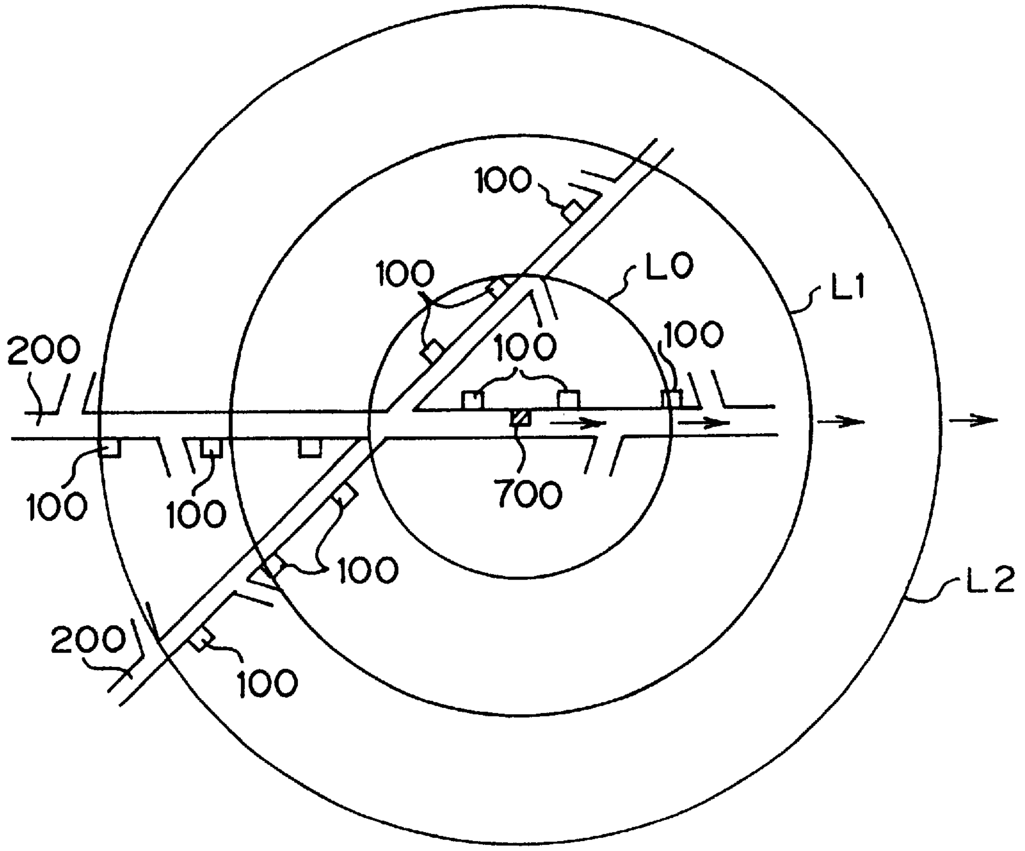
FIG. 11 is a table configuration diagram showing an example of configuration of an address table provided in the central communication system.
FIG. 12 is a block diagram showing another embodiment of the present invention as a whole.

In this embodiment of the present invention, when information communicating devices 100 transacting road information each other are present in the same segment, the central communication system 500 is not used, but when the information communicating devices 100 are within different segment, road information is relayed via the central communication system 500. FIG. 10 is a block diagram showing an example of configuration of the central communication system 500. This central communication system 500 comprises a CPU 501, a memory 502, and network interface circuits 504, 505 for connecting the central communication system 500 to the information communicating devices 100, and the components are connected to each other with a bus 503. It should be noted that an address table 506 for the information communicating device 100 connected to the central communication system 330 shown in FIG. 11 is provided in the memory 502. Also the memory 502 has a zone determination processing unit like that provided in the control unit 130 in the information communicating device 100.

When the central communication system 500 receives data comprising road information from one information communicating device 100, determination is made by the CPU 501 as to which network interface the data should be sent to. More specifically, the CPU 501 executes the zone determination processing 600 from values in the address table 806 according to the determination flow shown in FIG. 8 and decides a segment to which the road information should be transmitted. It should be noted that the address table 506 stores addresses of a group of connected devices for each network interface.

More specifically, the CPU 501 stores an address of data received from the network interface circuit 504 together with the corresponding interface number in the memory 502. Then the CPU 501 transfers data to a corresponding segment by using address data in the address table 506, executing zone determination in the zone determination processing 600, and transferring data once stored in the memory 502 to a network interface 505 which has been turned out to be within the zone. The processing after control is shifted to another information communicating device 100 in another segment is the same as operations of the information communicating device 100 described above.

It should be noted that road information transacted through the central communication system 500 has the configuration as shown in FIG. 6, but a result of zone determination indicates L1 when there is not any information at a specified level, or when there is not a field for L1, the data may not be transferred to the information communicating device 100. Also when road information is transferred to the network interface circuit 504, if a position of the information communicating device 100 as a target for data transfer is at a level L1 or L2, even if there are all fields for L0, L1, L2, only fields at levels L1 and L2 may be transferred.

FIG. 12 shows another embodiment of the present invention, and this figure shows a situation in which a road information transmission source or an event generating source such as an ambulance moves and also a communication zone, which is fixed in the example shown in FIG. 4, moves.

At present, a fire car, a patrol car or the like, all of which are categorized as an ambulance, runs sounding an alarming sound. This alarming sound is effective for alerting emergency to other vehicles running on a road, but sometimes where the ambulance is running can not clearly be detected due to a direction of wind or for some other reasons. Also the alarming sound generated by blowing a siren or the like is employed so that, when drivers of other vehicles running on the same road hear the alarming sound, the drivers stop or slowly run along the road edge for enabling the ambulance to run smoothly, and the alarming sound is not necessary for other drivers.

With the present invention, in contrast to the conventional technology, all vehicles are equipped with the vehicle-mounted communicating device 330, and transmission of information executed by the information communicating device 100 in the embodiment described above is executed by the vehicle-mounted communicating device 330 mounted on an ambulance 700, so that the same effect to vehicles nearby as that achieved by a siren can be realized, and drivers having nothing to do with the accident are not compelled to hear unnecessary noises.

Each of the zones shown in FIG. 4 is a fixed one centering on the information communicating device 100 near a site of an event, but in this embodiment, each zone is a movable zone centering on the ambulance 700 as shown in FIG. 12. Namely as indicated by an arrow in FIG. 12, each zone moves in the same direction as that in which the ambulance 700 moves. It can not be considered that a pedestrian carries the vehicle-mounted communication device 300, but by blowing a siren from the information communicating device 100 to pedestrians, it is possible to provide appropriate instructions with a smaller siren as compared to that currently used.

Figure 14:
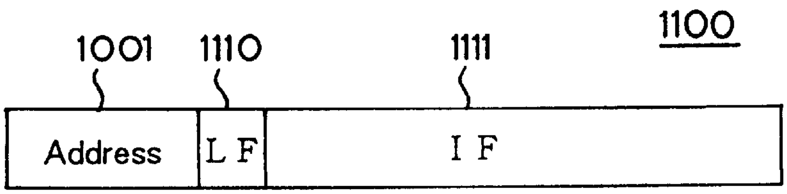
FIG. 14 is a signal configuration view showing another configuration of information transacted through the system according to the present invention.

FIG. 14 is a signal configuration diagram showing another embodiment of configuration of transacted information. In this example, a signal 110 comprises an address 1001, a field LF 1110 in which an information level is put in, and a field IF 1111 in which an identifier such as an information number is put in. A level of information is decided according to a value obtained by a level value obtained in the zone determination processing 600 carried out by the CPU 333 of the vehicle-mounted communication device 330 to a received value in LF 1110. For instance, when it is determined as a result of zone determination that a value of LF 1110 is 1, a level of this information is 2, so that the information I2 is selected and reported to vehicle's drivers.

When this type of signal format is used, a level information table 507 as shown in FIG. 15 is provided in a memory 335 of the vehicle-mounted communicating device 330, and information I2 obtained from the received IF value I and the computed level is selected. Then by outputting the selected information from the display section 336 or the speaker 337, appropriate information can be supplied to vehicle's drivers.

The above description assumes a case where zone determination is always executed by a CPU, but this determination may be executed by hardware. Also the above description assumes use of two-dimensional coordinates, but three-dimensional coordinates may be used. In that case, however, an X-axial coordinate value is not used for determination of a distance, but to select a running route when a Z-axial coordinate value varies as the X-axial coordinate value and the Y-axial coordinate value changes, for instance, because of a multi-dimensional crossing.

Whether information for another route at a multi-dimensional crossing is required for a driver of a vehicle or not depends of needs of each discrete driver, so that whether this type of data is included in information set in the vehicle-mounted communication device 300 for determination or not should be decided discretely. FIG. 2 shows an example based on two-layered structure, but a further larger network can be built by constructing the central communication system 500 based on multi-layered structure. Also the above description of the central communication system 500 was concentrated on the sections relating to communications, but the central communication system 500 may be used as a server for general services when it is equipped with a hard disk or the like and also incorporates value types of database.

The information communicating device 100 used coordinates at which the information communicating device 100 is installed as an address used in a signal for transacted road information, and as a method of fetching the coordinates, any appropriate one may be selected from a method of providing a GPS function on one of the sensors 110 for deciding coordinates, a method of incorporating a GPS function in the control unit 130 like in the vehicle-mounted information device 330, or the like.

Further in the future, when automatic driving with the AHS or the like is realized, such control as making a vehicle stop in front of a site of a traffic accident may be provided by using information at level 0 not as an alarm, but as control information for each vehicle.

Description of the embodiment above assumes a road and a vehicle as targets for control, but by making the vehicle-mounted communication device 330 portable and making use of the portable communication device 330 not for vehicles on an ordinary road but for pedestrians in paths in a building, application systems such as a guidance system or an alarming system in a building can be realized.

As described above, with the present invention, a transmitter of information can transmit road traffic information dependent on a position such as a site of a traffic accident varying the contents according to a position of a receiver of the information, and because of this feature an information supply service suited to each receiver of information can be realized, and also a positional relation between a transmitter of information and a receiver of the information can be determined according to the received data, so that only optical information can be distributed by taking into account the positional relation, and further as a level of importance of information such as urgency can be changed according to a distance to a receiver of the information, so that the receiver can select a method of responding to the event according to the importance indicated by the information, and further by changing the level, it becomes possible for a receiver of information to abort unnecessary information, which in turn contribute to prevention of increase in information traffic.

What is claimed is:

1. A road information communicating system for communication with vehicles comprising:

a central communication system; and, a plurality of distributed information processing units connected to said central communication system via a network, wherein each said distributed information processing unit comprises:

(1) a sensor means for receiving local road information regarding a road located within a local transmission area surrounding said sensor means;

(2) a means for computing local coordinates corresponding to said local road information;

(3) a means for relaying said local road information and said local coordinates over said network to said central communication system;

(4) a means for receiving remote road information and corresponding remote coordinates regarding a road located outside said local transmission area from said central communication system;

(5) a means for determining vehicle coordinates of said vehicles that are located within said local transmission area, the distance between each said vehicle coordinates and each said local coordinates, and the distance between each said vehicle coordinates and each said remote coordinates;

(6) a means for prioritizing said local road information and said remote road information based on said distances;

(7) a means for selecting a subset of said prioritized data for transmission to a vehicle located within said transmission area; and, (8) a means for relaying said subset of said prioritized data to said vehicle.

2. The road information communicating system of claim 1 wherein said means for selecting a subset of said prioritized data for transmission to a vehicle excludes prioritized data that corresponds to coordinates located more than a preselected distance from said vehicle.

3. The road information communicating system of claim 1 wherein said means for relaying said subset of said prioritized data to said vehicle further comprises a means for determining whether said subset was received by said vehicle.

4. The road information communicating system of claim 1 wherein each said distributed information processing unit further comprises an electronically accessible memory for storing road information.

* * * * *